Aug. 20, 1957 — M. D. WELSH — 2,803,470
FOLDING BABY STROLLER

Filed Jan. 18, 1954 — 3 Sheets-Sheet 1

INVENTOR.
MATILDA D. WELSH
BY
ATTORNEY

Aug. 20, 1957  M. D. WELSH  2,803,470
FOLDING BABY STROLLER

Filed Jan. 18, 1954  3 Sheets-Sheet 2

INVENTOR.
MATILDA D. WELSH
BY
*John H. Hanity*
ATTORNEY

Aug. 20, 1957  M. D. WELSH  2,803,470
FOLDING BABY STROLLER
Filed Jan. 18, 1954  3 Sheets-Sheet 3

INVENTOR.
MATILDA D. WELSH
BY
ATTORNEY

United States Patent Office 2,803,470
Patented Aug. 20, 1957

2,803,470

FOLDING BABY STROLLER

Matilda D. Welsh, Ladue, Mo.

Application January 18, 1954, Serial No. 404,408

6 Claims. (Cl. 280—41)

This invention pertains to strollers of the type having folding frames which may be collapsed so as to occupy small space when not in use.

An object of this invention is to provide such a folding frame for a stroller with means whereby it may be unfolded in a simple manner and by a positive action of some of its parts.

Generally stated the folding frame comprises a pair of legs pivotally connected together for folding movement one upon the other and a cross member movably connected to said legs and to a seat frame also connected to said legs. The arrangement is such that when the frame is folded, grasping said frame and pulling outward thereon will cause said cross bar to apply a leverage operating to unfold the legs.

A preferred embodiment of this invention is illustrated in the accompanying drawings in which.

Figure 1:
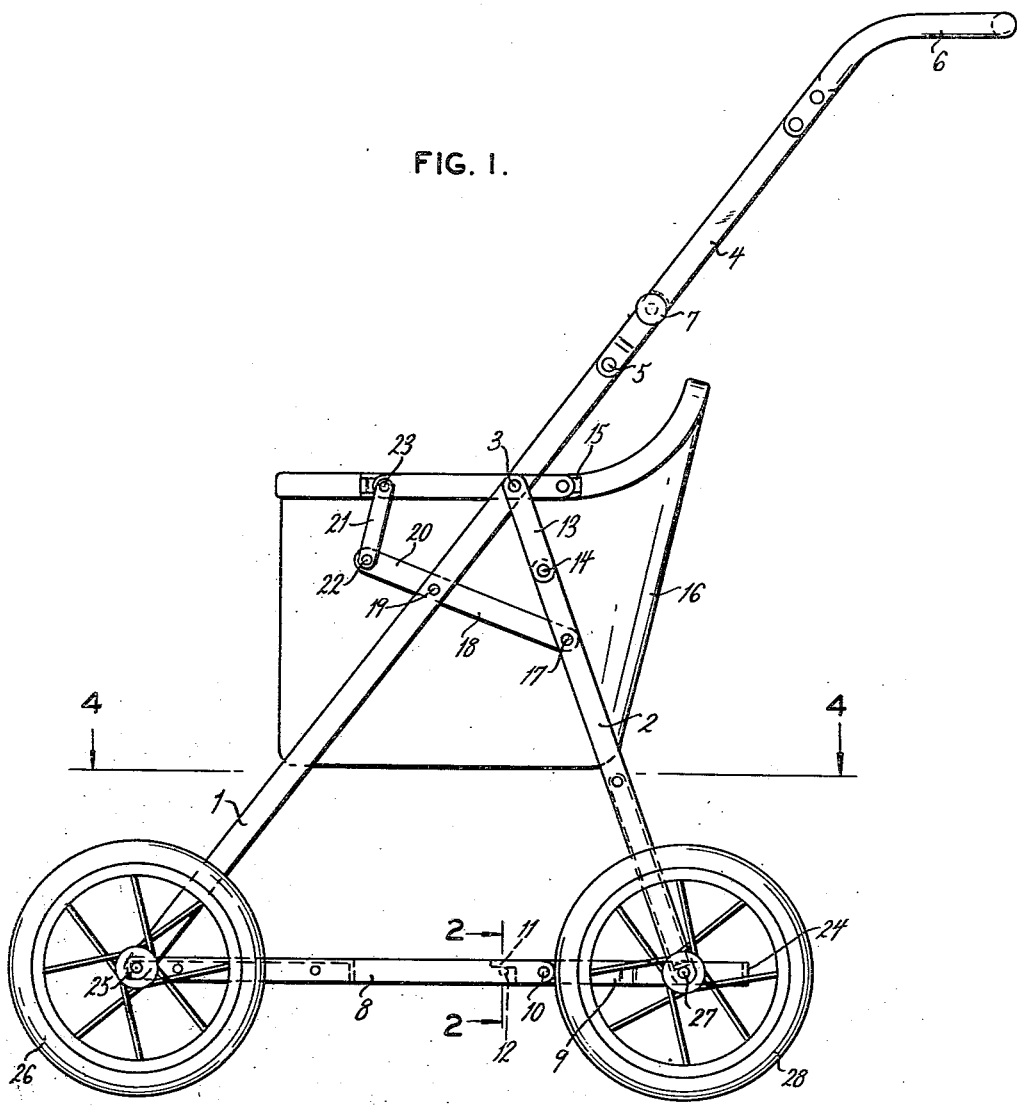
Fig. 1 is a side view of a stroller embodying this invention.
Figures 2, 3:
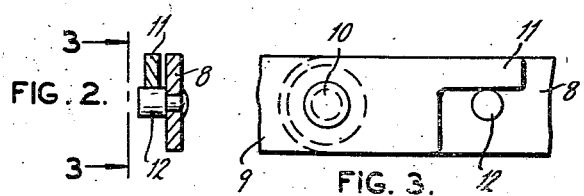
Fig. 2 is an enlarged detailed section on line 2—2 of Fig. 1.
Fig. 3 is a left hand side view of Fig. 2.
Figure 4:
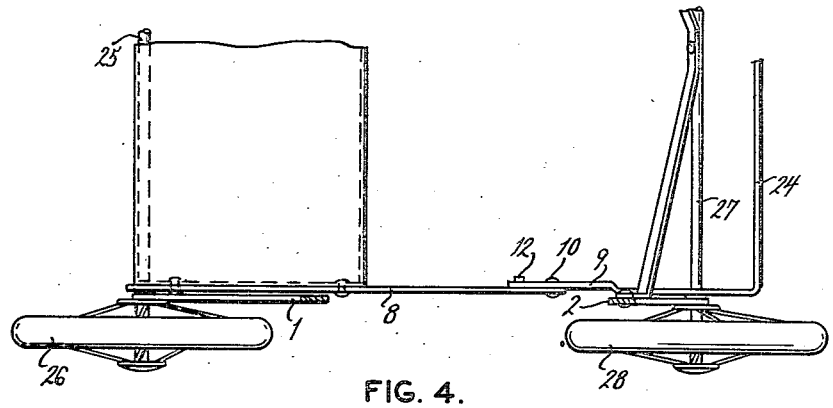
Fig. 4 is a partial section on line 4—4 of Fig. 1.

In accordance with this invention the stroller comprises a pair of frames such as shown in Fig. 1 in which only one frame appears, a duplicate thereof being arranged on the opposite side of the stroller. This frame comprises a front leg 1 and a rear leg 2 pivoted to each other at 3. At the upper end of the leg 1 a side bar 4 is pivoted at 5. The bar 4 is attached to a U-shaped handle bar 6, the other end of which is attached to a similar bar, not shown, on the other side of the stroller. A releasable pin 7 maintains the bar 4 in its extended position as shown in the drawing. When released, however, it permits said bar with the handle-bar 6 to fold forward and downward on the pivot 5.

The lower ends of the legs 1 and 2 are connected by a jointed frame comprising a front section 8 and a rear section 9 pivoted to each other at 10. The bar 9 has an extension 11 normally engaging a pin 12 on the bar 8 to maintain said frame in extended position as shown in Fig. 1, but to permit the same to be folded by moving the pivot 10 upward. The leg 1 is connected to the section 8 by the front axle 25 carrying road wheels 26 only one of which is shown. Similarly the leg 2 is connected to the rear section 9 by the rear axle 27 carrying rear wheels 28.

The construction described so far is well known in the art and is not a part of the present invention. As shown in Fig. 1, the leg 2 has an upper extension 13 pivoted at 14 to the upper portion of said leg and at 3 to the leg 1. A seat frame 15 is pivoted to one or both of the legs 1 and 2. As shown in Fig. 1, it is pivoted to both said legs by the pivot 3. It may, however, be connected to either of said legs at an adjacent point. The frame 15 is adapted to support a seat structure 16 of any suitable type.

Pivoted at 17 to the upper portion of the leg 2 is a cross bar 18. Said cross bar is also pivoted at 19 to the leg 1 and has an extension 20 beyond said pivot 19. At the end of said extension a link 21 is pivoted at 22 to the cross bar 18 and at 23 to the seat frame 15.

Figures 5, 8:
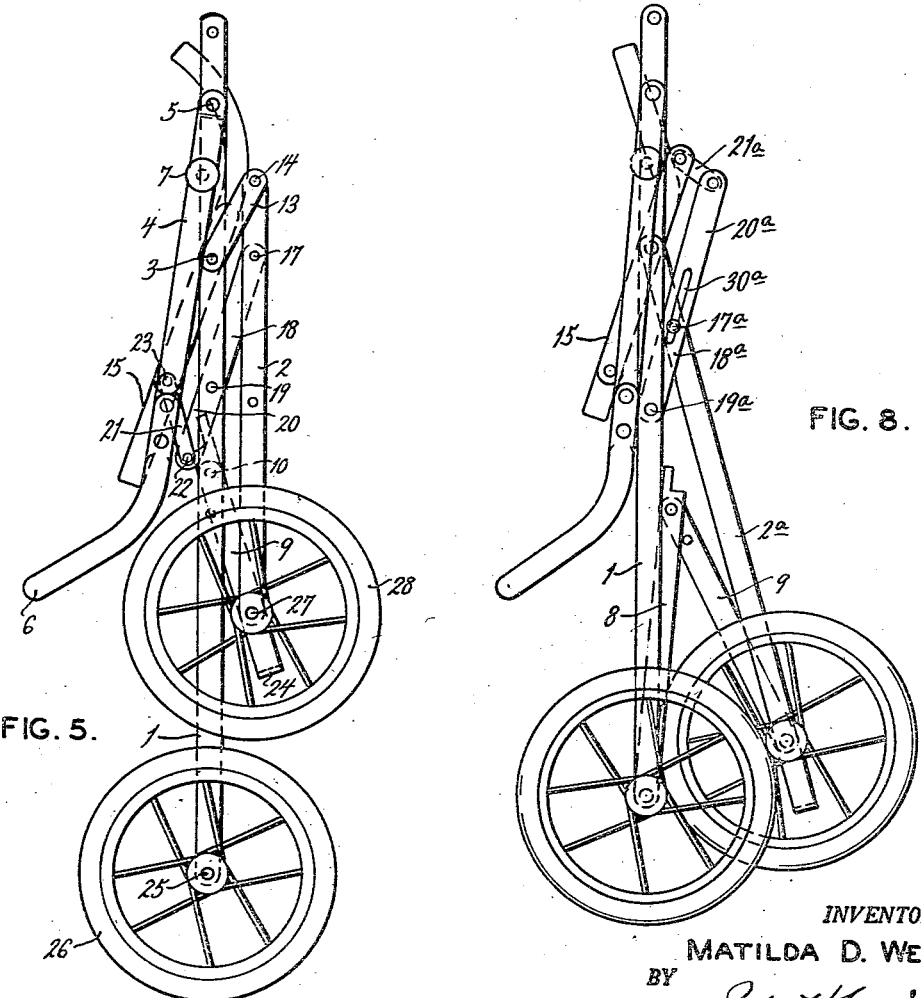
Fig. 5 is a side view of the frame when in collapsed position.
Fig. 8 is a side view of the embodiment of Fig. 6 in collapsed position.
Figure 7:
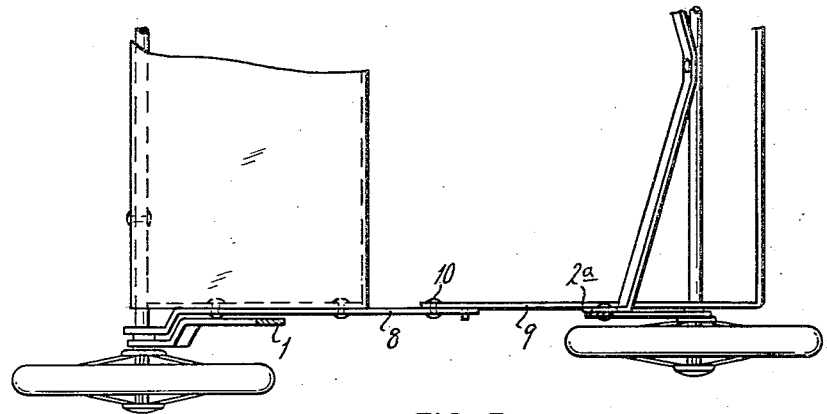
Fig. 7 is a partial section on line 7—7 of Fig. 6.

To fold this frame, the operator presses with the foot on an extension 24 beyond the rear axle. This causes the bottom frame to fold by raising the pivot 12. At the same time the leg 2 pivots on the pivot 17, causing the pivot 14 to move toward the rear. As the movement continues, the pivots 14 and 17 move upward while the link 21 moves downward until they finally reach the collapsed position shown in Fig. 5. The pins 7 on both sides of the frame are then released and the handle bar 6 is folded forward and downward on the pivot 5 to the position of Fig. 5. It may be seen that with the frame in the folded position of Fig. 5, the operator may grasp the lower end of the seat frame 15 and pull it outward toward the left Fig. 5, at the same time holding the handle bar 6. This operates to pull the lower end of the cross bar 18 toward the left Fig. 5, thereby forcing the upper end of said cross bar in the opposite direction. This moves the leg 2 to the right, Fig. 5, in an unfolding movement. It has been found that this provides a very easy and rapid method for unfolding the frame from its collapsed position.

Figure 6:
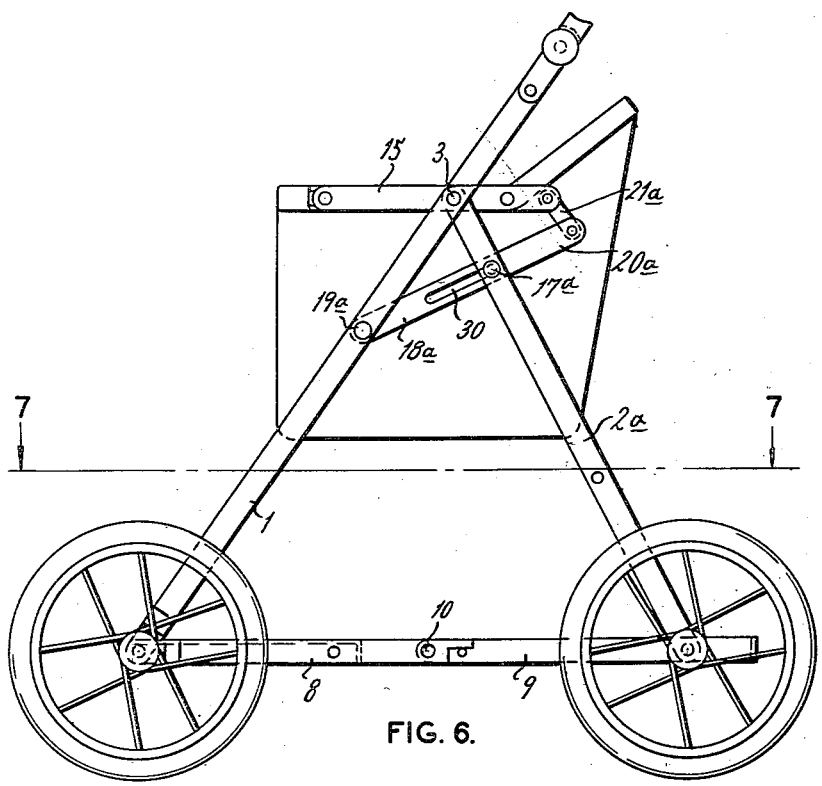
Fig. 6 is a side view illustrating another embodiment of this invention.

In the embodiment of Fig. 6 the leg 1 is of the same structure as already described. The leg 2a, however, does not have the upper section 13 but extends continuously to the pivot 3. The seat frame 15 is also mounted on the pivot 3 as before. The cross bar 18a is now pivoted at its forward end at 19a to the leg 1. Said cross bar is provided with a slot 30 extending therealong and the pin 17a attached to the leg 2a is slidably engaged in the slot 30. The cross bar 18a has an extension 20a which is now rearward from the leg 2 and is connected by a link 21a to the seat frame 15. The operation of this embodiment is similar to that of the one described above. As the legs move to folded position on the pivot 3, the pin 17a slides downward along the slot 30. At the same time the extension 20a, acting through the link 21a, moves the rear portion of the seat frame 15 upward to the position shown in Fig. 8. In this case also when it is desired to unfold the frame, pulling the lower end of the seat frame 15 to the left, Fig. 8, will cause the link 21a to move the cross bar 18a to the right, Fig. 8. This causes the slot 30 to exert pressure on the pin 17a toward the right, Fig. 8, thereby tending to unfold the leg 2a.

Thus in accordance with this invention, the frame may be unfolded by positive action of the linkage involved in its structure by simply pulling outward on the lower end of the seat frame.

Various changes may be made in the details of construction, within the scope of the appended claims, without departing from the spirit of this invention. Parts of the invention may be used without the whole, and improvements may be added, while retaining some or all of the advantages of the invention.

I claim:

1. In a stroller of the character described, a folding frame comprising, a first leg, a second leg movably connected at its upper end to the upper portion of said first leg for folding thereupon, a seat frame pivoted to one of said legs for downward folding movement therewith, a lever movably connected to said legs for folding movement therewith, and a connection between said lever and said seat frame operable by moving said seat frame upward to unfold said legs.

2. In a stroller of the character described, a folding frame comprising, a first leg, a second leg movably connected at its upper end to the upper portion of said first leg for folding thereupon, a seat frame pivoted to one of said legs for folding movement therewith, a lever pivoted at one end thereof to one of said legs, a link directly connected to the other end of said lever and said seat frame, and a movable connection between the other of said legs and an intermediate part of said lever, whereby movement of said seat frame from folded position will unfold said legs.

3. In a stroller of the character described, a folding frame comprising, a first leg, a second leg movably connected at its upper end to the upper portion of said first leg for folding thereupon, a seat frame pivoted to one of said legs for folding movement therewith, a lever pivoted at spaced points to said legs, said second leg having a simple pivotal joint between its attachment points to said first leg and said lever, and a link pivotally connected directly to an extended portion of said lever and to said seat frame.

4. In a stroller of the character described, a folding frame comprising, a first leg, a second leg having a short upper section pivoted thereto and to the upper portion of said first leg, a lever pivoted at an intermediate portion thereof to said first leg and at an end thereof to said second leg below said upper section, a seat frame pivoted to one of said legs, and a link pivoted directly to said seat frame and to the other end of said lever.

5. In a stroller of the character described, a folding frame comprising, a first leg, a second leg pivoted at its upper end to the upper portion of said first leg for folding movement thereupon, a one-piece cross bar pivoted to said first leg and having a slot extending therealong, said second leg having a pin slidably engaging said slot, a seat frame pivoted to one of said legs, and a link pivoted directly to said seat frame and to said cross bar beyond said slot.

6. In a stroller of the character described, a folding frame comprising, a seat frame, front and rear legs, adjacently pivoted at their upper portions to said seat frame for folding movement, a lever pivoted at one of its ends to one of said legs and movably connected at an intermediate part thereof to said other leg, said lever having an extension beyond said other leg, and a link pivoted at one end to said extension and at its other end to said seat frame, whereby folding said legs together will cause said lever to fold said seat frame downward upon said front leg.

References Cited in the file of this patent

UNITED STATES PATENTS

| 606,451 | English | June 28, 1898 |
| 1,176,179 | Tervilliger | Mar. 21, 1916 |
| 1,815,643 | Allerding | July 21, 1931 |
| 2,171,013 | Stinson | Aug. 29, 1939 |